United States Patent
Lee

(10) Patent No.: US 8,290,080 B2
(45) Date of Patent: Oct. 16, 2012

(54) TECHNIQUES FOR TRANSMITTING DATA IN A WIRELESS COMMUNICATION SYSTEM USING QUASI-ORTHOGONAL SPACE-TIME CODE

(75) Inventor: Hoojin Lee, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 813 days.

(21) Appl. No.: 12/371,147

(22) Filed: Feb. 13, 2009

(65) Prior Publication Data

US 2010/0208833 A1    Aug. 19, 2010

(51) Int. Cl.
   *H04B 7/02*    (2006.01)
(52) U.S. Cl. ............................................. 375/267
(58) Field of Classification Search ............ 375/267
   See application file for complete search history.

(56) References Cited

U.S. PATENT DOCUMENTS

| | | | |
|---|---|---|---|
| 7,184,488 B2 | 2/2007 | Papadias et al. | |
| 2006/0056538 A1* | 3/2006 | Nam et al. | 375/298 |
| 2007/0036202 A1* | 2/2007 | Ge et al. | 375/141 |
| 2007/0281633 A1* | 12/2007 | Papadopoulos | 455/101 |
| 2010/0008439 A1* | 1/2010 | Lim et al. | 375/267 |
| 2010/0086080 A1* | 4/2010 | Zhu et al. | 375/298 |

OTHER PUBLICATIONS

O. Tirkkonen et al., Minimal Nonorthogonality Rate 1 Space-time Block Code for 3+ Tx Antennas, in Proc. IEEE ISSSTA, vol. 2, New Jersey, Sep. 2000, pp. 429-432.
W. Su et al., Signal Constellations for Quasi-Orthogonal Space-time Block Codes with Full Diversity, IEEE Transactions on Information Theory, vol. 50, pp. 2331-2347, Oct. 2004.
M.Z.A. Khan, Single-symbol and Double-symbol Decodable STBC's for MIMO Fading Channels, Ph. D. Dissertation, Indian Institute of Science, Bangalore, India 2005.

* cited by examiner

*Primary Examiner* — Don N Vo
(74) *Attorney, Agent, or Firm* — Yudell Isidore Ng Russell PLLC

(57) ABSTRACT

A technique for communicating in a wireless communication system includes creating, using two distinct Alamouti codes, a power-scaled quasi-orthogonal space-time block code. The technique further includes transmitting, using a transmitter, the power-scaled quasi-orthogonal space-time block code over multiple antennas (e.g., three or four transmit antennas).

15 Claims, 2 Drawing Sheets

TECHNIQUES FOR TRANSMITTING DATA IN A WIRELESS COMMUNICATION SYSTEM USING QUASI-ORTHOGONAL SPACE-TIME CODE

BACKGROUND

1. Field

The present disclosure is generally directed to transmitting data and, more particularly, to techniques for transmitting data in a wireless communication system that employs quasi-orthogonal space-time block code.

2. Related Art

Antenna diversity, also known as spatial diversity, is a wireless diversity scheme that utilizes two or more antennas (at a transmitter and/or at a receiver) to improve the quality and reliability of a wireless link. When spatial diversity is achieved, a signal transmitted from each antenna experiences a different fading environment. As such, assuming a transmission from one antenna experiences a deep fade, it is likely that a transmission from another antenna will not experience a deep fade when transmission channels are not highly correlated.

Space-time code (STC) refers to an approach that may be employed to improve the reliability of data transmission in wireless communication systems. STC employs multiple transmit antennas and relies on transmitting redundant data copies to a receiver, via the multiple transmit antennas. STC is based on the premise that at least one of the redundant data copies survives a transmission path (between a transmitter and a receiver) in a state that allows reliable decoding. STCs are generally divided into two main types: space-time trellis codes (STTCs) and space-time block codes (STBCs). An STTC distributes a trellis code over multiple antennas and multiple time-slots and provides both coding gain and diversity gain. In contrast, STBCs act on a block of data and only provide diversity gain. In general, STBCs are less complex to implement than STTCs. STCs may be further subdivided according to whether a receiver has knowledge of channel impairments or channel statistics. In a coherent STC, a receiver has knowledge of channel impairments (e.g., through training or some form of estimation). In a non-coherent STC, a receiver has knowledge of channel statistics, but does not have knowledge of channel impairments. In a differential STC, neither channel impairments nor channel statistics are available.

STBCs exploit various received versions of data from respective data streams to improve the reliability of data transmissions. The fact that a transmitted signal traverses a potentially difficult environment with scattering, refraction, reflection, etc. (and may then be further corrupted by thermal noise at a receiver) means that some received copies of transmitted data are usually better than other received copies of transmitted data. In general, when channels are not highly correlated, redundancy improves the probability that one or more of the received copies of transmitted data may be decoded correctly. Typically, STCs attempt to combine all received copies of a transmitted signal in an optimal way to maximize information extraction from each of the received copies. An STBC is usually represented by a matrix, in which each row represents a time slot and each column represents a different antenna over time. Elements of the matrix correspond to symbols, where $s_{ij}$ is the symbol to be transmitted in time slot 'i' from antenna 'j'. In a system, there are generally 'T' time slots, $N_T$ transmit antennas, and $N_R$ receive antennas. A length of a code block usually corresponds to a length of 'T'. A code rate of an STBC measures how many symbols per time slot are transmitted, on average, over the course of one codeword.

STBCs may be orthogonal or quasi-orthogonal. An orthogonal STBC is designed such that vectors representing any pair of columns taken from a coding matrix are orthogonal. In general, receivers may employ linear single-symbol decoding for orthogonal STBCs. A disadvantage of some orthogonal STBCs is that all but one of the orthogonal codes may sacrifice some proportion of their data rate. Alamouti code, which is an orthogonal STBC that was originally designed for a system having two transmit antennas, provides a full-rate code that transmits a symbol in each time slot for a system having two transmit antennas. Systems that employ Alamouti code with two transmit antennas can achieve full-diversity gain without sacrificing data rate, when complex symbols are employed. In general, there are no known orthogonal STBCs for a system having more than two transmit antennas that can achieve full-rate transmission. With orthogonal STBCs, maximum likelihood (ML) decoding can be performed at a receiver using linear processing. In contrast, quasi-orthogonal STBCs, which allow some inter-symbol interference, can generally achieve full-rate transmission and provide better error-rate performance under harsh transmission conditions, albeit while requiring more complex decoding procedures.

Several types of quasi-orthogonal space-time block codes (QSTBCs) with double-symbol decoding (i.e., pair-wise symbol decoding) have been proposed in an effort to achieve full-rate transmission for a system having more than two transmit antennas. As noted above, in contrast to orthogonal STBCs, QSTBCs have some inter-symbol interference. However, unless constellation rotation is employed, known QSTBCs only provide partial diversity gain. An STBC that implements a coordinate interleaved orthogonal design (STBC-CIOD) and a minimum decoding complexity QSTBC (MDC-QSTBC) have been proposed to achieve full-diversity gain and full-rate transmission with single-symbol decoding. However, the STBC-CIOD requires special procedures, such as constellation rotation and coordinate interleaving, at a transmitter. Moreover, the MDC-QSTBC requires constellation rotation and dispersive mapping of I and Q components of symbols to be transmitted. Furthermore, optimum rotation angles for STBC-CIOD and MDC-QSTBC are different for each modulation type (e.g., QPSK, 8-PSK, 16-QAM, etc.).

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

FIG. 3 is a block diagram of an example multiple-input multiple-output (MIMO) wireless communication system that may include transmitters configured according to the

DETAILED DESCRIPTION

Figure 2:
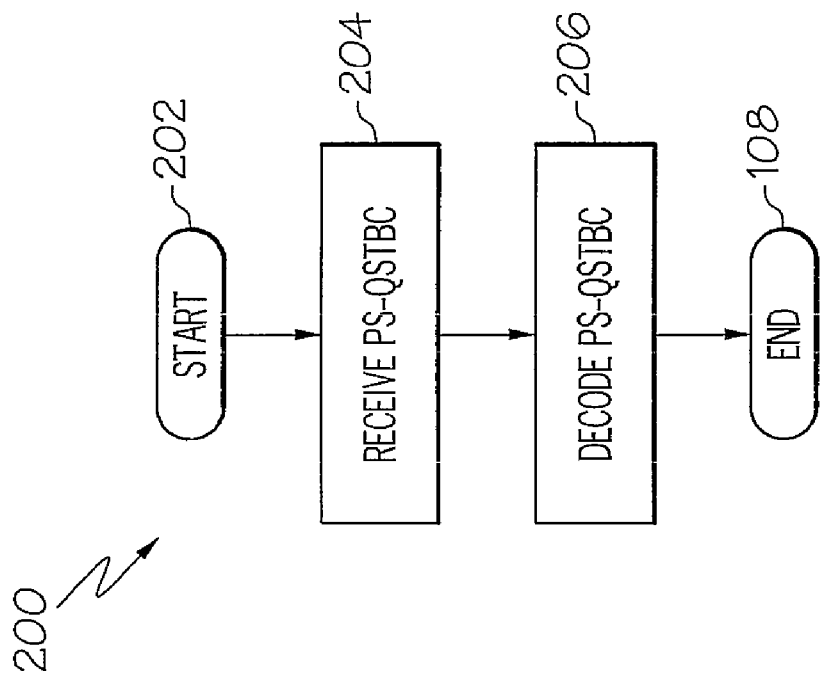
FIG. 2 is a flowchart of an example process for communicating in a wireless communication system utilizing a PS-QSTBC that is employed at a receiver, according to another embodiment of the present invention.

In the following detailed description of exemplary embodiments of the invention, specific exemplary embodiments in which the invention may be practiced are described in sufficient detail to enable those of ordinary skill in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents. In particular, although various embodiments are described below in conjunction with a base station, it will be appreciated that the present invention is not so limited and may be embodied in various devices.

The term "channel," as may be used herein, includes one or more subcarriers, which may or may not be adjacent. Transmitters implemented within a communication system, configured according to various embodiments of the present disclosure, may transmit information using a phase shift keying (PSK), a quadrature amplitude modulation (QAM), or other data modulation scheme, depending upon which modulation scheme is scheduled. For example, any of the various PSK (such as pi/2 BPSK, QPSK, and 8-PSK), or QAM (such as 16-QAM and 64-QAM) modulation techniques may be implemented. While the discussion herein is directed to communication between a transmitter in a base station (BS) and a receiver in a subscriber station (SS), the techniques disclosed herein are broadly applicable to communication between a receiver and a transmitter irrespective of the location of the transmitter and the receiver.

According to various aspects of the present disclosure, a power-scaled QSTBC (PS-QSTBC) is disclosed that generally exhibits improved performance with increased spatial correlation and time selectivity of fading channels, as compared with known QSTBCs that require optimum rotation angles. When an appropriate power-scaling factor is chosen, the disclosed PS-QSTBC can achieve full-diversity gain and full-rate transmission. An optimum power-scaling factor for the disclosed PS-QSTBC is fixed for different modulation types, while achieving full-diversity gain and full-rate transmission. In contrast, an optimum rotation angle for conventional QSTBCs that employ constellation rotation depends on the modulation type. As is further discussed herein, the disclosed PS-QSTBC is robust against spatial correlation and/or time-selectivity of fading channels. In at least one embodiment, a codeword for the disclosed PS-QSTBC is constructed based on two unbalanced power scaled Alamouti codes. In general, the disclosed PS-QSTBC provides error rate performance in spatially correlated and/or time-selective fading channels that is better than known QSTBCs.

A QSTBC with four transmit antennas can be represented with two distinct Alamouti codes as follows:

$$A = \begin{bmatrix} s_1 & s_2 \\ -s_2^* & s_1^* \end{bmatrix} \text{ and } B = \begin{bmatrix} s_3 & s_4 \\ -s_4^* & s_3^* \end{bmatrix}$$

where, $S_1$, $S_2$, $S_3$, and $S_4$ correspond to four different symbols. A first conventional QSTBC that employs a constellation rotation approach may be represented by a transmission codeword $C_Q$, using two distinctive Alamouti codes, as follows:

$$C_Q = \begin{bmatrix} A & B \\ B & A \end{bmatrix},$$

where the symbols $S_1$ and $S_2$ are elements of 'A', the symbols $S_3$ and $S_4$ are elements of $e^{j\theta_Q}A$ or 'B', 'A' denotes a constellation set, and 'B' denotes the constellation set 'A' rotated by $\theta_Q$ (which is the optimum rotation angle). For QPSK and 8-PSK, $\theta_Q$ is equal to $\pi/4$ and $\pi/8$, respectively.

A second conventional QSTBC that is relatively robust against spatial correlation and/or time-selectivity of fading channels may be represented by a transmission codeword $C_K$, using two distinctive Alamouti codes, as follows:

$$C_K = \begin{bmatrix} A+B & 0 \\ 0 & A-B \end{bmatrix} = \begin{bmatrix} s_1+s_3 & s_2+s_4 & 0 & 0 \\ -s_2^*-s_4^* & s_1^*+s_3^* & 0 & 0 \\ 0 & 0 & s_1-s_3 & s_2-s_4 \\ 0 & 0 & -s_2^*+s_4^* & s_1^*-s_3^* \end{bmatrix}$$

where the symbols $S_1$ and $S_2$ are elements of the constellation set 'A' and the symbols $S_3$ and $S_4$ are elements of the constellation set 'B'. It should be appreciated that the codeword $C_K$ is not capable of achieving full-diversity gain.

According to various aspects of the present disclosure, a PS-QSTBC may be represented by a transmission codeword $C_N$, using two distinctive Alamouti codes, as follows:

$$C_N = \begin{bmatrix} \sqrt{\frac{P}{2}-\lambda}\,A + \sqrt{\lambda}\,B & 0 \\ 0 & \sqrt{\lambda}\,A - \sqrt{\frac{P}{2}-\lambda}\,B \end{bmatrix}, 0 \leq \lambda < \frac{P}{2}$$

where $\lambda$ is a power-scaling factor and P is a total transmitted power per symbol duration. In a system that achieves full-diversity gain with four transmit antennas, assuming a single antenna system has a P of one, the system with four transmit antennas has a P of four. The PS-QSTBC may be further represented by the transmission codeword $C_N$ as follows:

$$= \begin{bmatrix} \alpha s_1+\beta s_3 & \alpha s_2+\beta s_4 & 0 & 0 \\ \tilde{s}_1 & \tilde{s}_2 & & \\ -\alpha s_2^*-\beta s_4^* & \alpha s_1^*+\beta s_3^* & 0 & 0 \\ 0 & 0 & \beta s_1-\alpha s_3 & \beta s_2-\alpha s_4 \\ & & \tilde{s}_3 & \tilde{s}_4 \\ 0 & 0 & -\beta s_2^*+\alpha s_4^* & \beta s_1^*-\alpha s_3^* \end{bmatrix},$$

$$\alpha = \sqrt{\frac{P}{2}-\lambda},\ \beta = \sqrt{\lambda}$$

An optimum scaling factor ($\lambda_{opt}$) for four transmit antennas was found through simulation to be equal to 0.1382P, where P is the total transmitted power per symbol duration and is equal to four for full-diversity gain. It should be noted that the codeword $C_N$ is capable of achieving full-diversity gain when an optimum power-scaling value is utilized.

At a receiver, an input-output relationship of the disclosed PS-QSTBC may be defined by the equation $r=H\hat{s}+v$ (where 'H' is the channel matrix, '$\hat{s}$' is an element of the constellation sets 'A' and 'B', and 'v' corresponds to an added white Gaussian noise (AWGN) matrix) as follows:

$$r = [\, r_1(1) \;\; r_1^*(2) \;\; r_1(3) \;\; r_1^*(4) \; \ldots \; r_{N_R}(1) \;\; r_{N_R}^*(2) \;\; r_1(3) \;\; r_{N_R}^*(4)\, ]^T$$

$$H = [H_1^T, H_2^T, \ldots, H_{N_R}^T]^T \text{ with}$$

$$H_m = \begin{bmatrix} h_{m1} & h_{m2} & 0 & 0 \\ h_{m2}^* & -h_{m1}^* & 0 & 0 \\ 0 & 0 & h_{m3} & h_{m4} \\ 0 & 0 & h_{m4}^* & -h_{m3}^* \end{bmatrix}, m = 1, 2, \ldots, N_R$$

where $N_R$ corresponds to a number of receive antennas, $h_{mn}$ corresponds to a channel path gain from an $n^{th}$ transmit antenna to an $m^{th}$ receive antenna. The symbols '$\hat{s}$' may be further represented as follows:

$$\underbrace{\begin{bmatrix} \tilde{s}_1 \\ \tilde{s}_2 \\ \tilde{s}_3 \\ \tilde{s}_4 \end{bmatrix}}_{\tilde{s}} = \begin{bmatrix} \alpha & 0 & \beta & 0 \\ 0 & \alpha & 0 & \beta \\ \beta & 0 & -\alpha & 0 \\ 0 & \beta & 0 & -\alpha \end{bmatrix} \begin{bmatrix} s_1 \\ s_2 \\ s_3 \\ s_4 \end{bmatrix},$$

The AWGN matrix 'v' may be further represented as follows:

$$v = [v_1(1)v_1^*(2)v_1(3)v_1^*(4) \ldots v_{N_R}(1)v^*_{N_R}(2)v_1(3) \; v^*_{N_R}(4)]^T$$

A maximum likelihood (ML) detection procedure may be employed on the codeword, which after channel-matched filtering may be represented as follows:

$$\underbrace{\begin{bmatrix} \tilde{r}(1) \\ \tilde{r}(2) \\ \tilde{r}(3) \\ \tilde{r}(4) \end{bmatrix}}_{r=H^H r} = \underbrace{\begin{bmatrix} \eta & 0 & 0 & 0 \\ 0 & \eta & 0 & 0 \\ 0 & 0 & \phi & 0 \\ 0 & 0 & 0 & \phi \end{bmatrix}}_{H^H H} \underbrace{\begin{bmatrix} \tilde{s}_1 \\ \tilde{s}_2 \\ \tilde{s}_3 \\ \tilde{s}_4 \end{bmatrix}}_{\tilde{s}} + \underbrace{\begin{bmatrix} \tilde{v}(1) \\ \tilde{v}(2) \\ \tilde{v}(3) \\ \tilde{v}(4) \end{bmatrix}}_{\tilde{v}=H^H v}$$

$$\eta = \sum_{m=1}^{N_R} |h_{m1}|^2 + |h_{m2}|^2$$

$$\phi = \sum_{m=1}^{N_R} |h_{m3}|^2 + |h_{m4}|^2$$

Double-symbol ML decoding may be achieved as is illustrated in the equations that follow:

$$\begin{bmatrix} \tilde{r}(1) \\ \tilde{r}(3) \end{bmatrix} = G \begin{bmatrix} s_1 \\ s_3 \end{bmatrix} + \begin{bmatrix} \tilde{v}(1) \\ \tilde{v}(3) \end{bmatrix} \text{ and } \begin{bmatrix} \tilde{r}(2) \\ \tilde{r}(4) \end{bmatrix} = G \begin{bmatrix} s_2 \\ s_4 \end{bmatrix} + \begin{bmatrix} \tilde{v}(2) \\ \tilde{v}(4) \end{bmatrix},$$

where $$G = \begin{bmatrix} \eta & 0 \\ 0 & \phi \end{bmatrix} \begin{bmatrix} \alpha & \beta \\ \beta & -\alpha \end{bmatrix}$$

Appropriate constellation points for the symbols $S_1$, $S_2$, $S_3$, and $S_4$ may be found by determining a minimum Euclidean distance to a constellation point, which may be represented by the following equations:

$$\min_{\{s_1,s_3\} \in A \times A} \left\| \begin{bmatrix} \tilde{r}(1) \\ \tilde{r}(3) \end{bmatrix} - G \begin{bmatrix} s_1 \\ s_3 \end{bmatrix} \right\|^2$$

$$\min_{\{s_2,s_4\} \in A \times A} \left\| \begin{bmatrix} \tilde{r}(2) \\ \tilde{r}(4) \end{bmatrix} - G \begin{bmatrix} s_2 \\ s_4 \end{bmatrix} \right\|^2$$

In this case, a point closest to a symbol is most likely to indicate the correctly decoded symbol.

A linear detection procedure (e.g., zero forcing (ZF) and minimum mean square error (MMSE)) may be implemented by filtering using the equations that follow:

$$\begin{bmatrix} \bar{r}(1) \\ \bar{r}(3) \end{bmatrix} = W \begin{bmatrix} \tilde{r}(1) \\ \tilde{r}(3) \end{bmatrix} = WG \begin{bmatrix} s_1 \\ s_3 \end{bmatrix} + W \begin{bmatrix} \tilde{v}(1) \\ \tilde{v}(3) \end{bmatrix}$$

$$\begin{bmatrix} \bar{r}(2) \\ \bar{r}(4) \end{bmatrix} = W \begin{bmatrix} \tilde{r}(2) \\ \tilde{r}(4) \end{bmatrix} = WG \begin{bmatrix} s_2 \\ s_4 \end{bmatrix} + W \begin{bmatrix} \tilde{v}(2) \\ \tilde{v}(4) \end{bmatrix}$$

For ZF $W=G^{-1}$ and for MMSE W may be determined as follows:

$$W=[G^H G+SNR^{-1}I]^{-1}G^H$$

where I is the identity matrix, SNR is the signal-to-noise ratio, and $G^H$ is the Hermitian of the matrix G.

A system having four transmit antennas and one receive antenna was simulated for Gray-coded QPSK and 16-QAM. A total transmitted power per symbol duration 'P' was set equal to four. Spatial correlation at transmit antennas for a first case was set to no spatial correlation (i.e., $\rho=0$) and spatial correlation for a second case was set to $\rho=0.9$ and 0.95 in the matrix set forth below:

$$\begin{vmatrix} 1 & \rho & \rho^2 & \rho^3 \\ \rho & 1 & \rho & \rho^2 \\ \rho^2 & \rho & 1 & \rho \\ \rho^3 & \rho^2 & \rho & 1 \end{vmatrix}$$

A normalized Doppler frequency for the first case with time-flat fading channels (i.e., time-invariant channels) was set to 0 and a normalized Doppler frequency for the second case with a time-selective fading channel (i.e., time-varying channel) was set to 0.03. Perfect channel estimation at the receiver was assumed and a performance comparison was based on an average bit error-rate (BER). For QPSK and 16-QAM modulation simulations, in the uncorrelated time-flat fading channel case, the average BER performance of the PS-QSTBC was substantially the same as that of the known QSTBC with optimum phase rotation, while maintaining full-diversity without requiring phase rotation. For QPSK modulation, in spatially correlated and/or time-selective fading channel (i.e., time-varying channel) cases, the PS-QSTBC exhibits a better average BER performance than known QSTBCs that employ optimal phase rotation.

According to one embodiment of the present disclosure, a technique for communicating in a wireless communication system includes creating, using two distinct Alamouti codes, a power-scaled quasi-orthogonal space-time block code (PS-QSTBC). The technique further includes transmitting, using a transmitter, the PS-QSTBC over multiple antennas.

According to another embodiment of the present disclosure, a technique for communicating in a wireless communication system includes receiving, using a receiver, a power-scaled quasi-orthogonal space-time block code (PS-QSTBC). In this case, the PS-QSTBC is based on two distinct Alamouti codes. The PS-QSTBC is transmitted over multiple antennas. The technique further includes decoding the PS-QSTBC to recover transmitted data.

According to a different aspect of the present disclosure, a wireless communication device includes a circuit (e.g., a processor such as a digital signal processor (DSP) or an application specific integrated circuit (ASIC)) and a transmitter coupled to the circuit. The circuit is configured to create, using two distinct Alamouti codes, a power-scaled quasi-orthogonal space-time block code (PS-QSTBC). The transmitter is configured to transmit the PS-QSTBC over multiple antennas.

Figure 1:
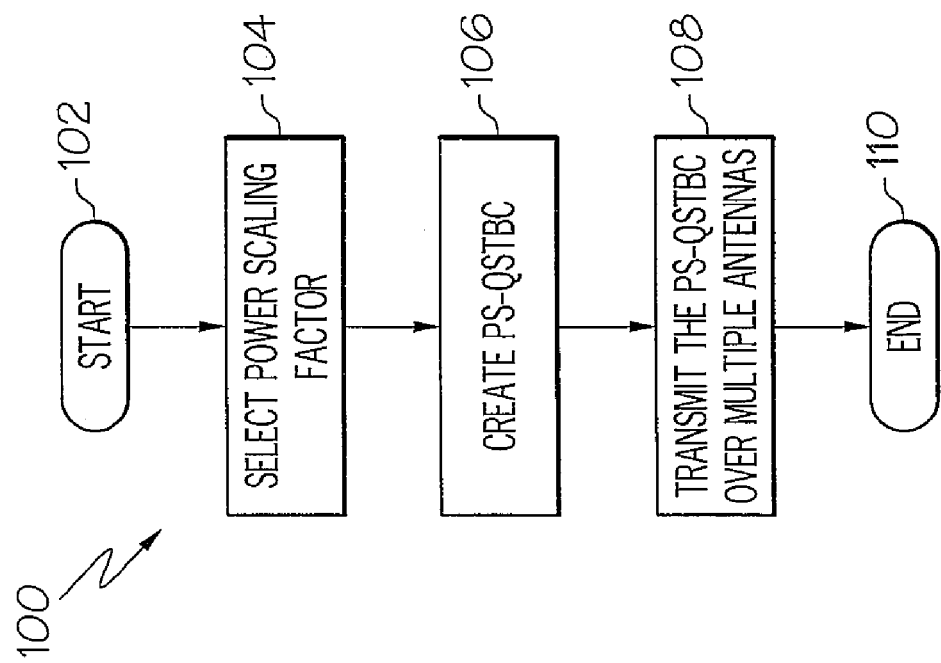
FIG. 1 is a flowchart of an example process for communicating in a wireless communication system utilizing a power-scaled quasi-orthogonal space-time block code (PS-QSTBC) that is employed at a transmitter, according to one embodiment of the present invention.

With reference to FIG. 1, a flowchart of an example process 100, for communicating in a wireless communication system utilizing a power-scaled quasi-orthogonal space-time block code (PS-QSTBC) that is employed at a transmitter, according to one embodiment of the present disclosure, is illustrated. The process 100 (which may be implemented in software or hardware) is initiated in block 102, at which point control transfers to block 104. In block 104, a power-scaling factor is selected for the PS-QSTBC. In a typical case, the power-scaling factor (which is the same for each modulation type) is selected to provide full-diversity gain and full-rate transmission for data to be transmitted. Next, in block 106, the PS-QSTBC is created using two distinct Alamouti codes and the selected power-scaling factor.

Then, in block 108, the PS-QSTBC is transmitted over multiple antennas. For example, the PS-QSTBC may be transmitted via a transmitter of a base station (BS) over, for example, four or three (by eliminating a column of a codeword from the four transmit antenna case) transmit antennas. In various embodiments, the two distinct Alamouti codes are utilized to form a sixteen element matrix having four columns and four rows. In at least one embodiment, each of the four columns of the matrix correspond to respective transmit antennas and each of the four rows correspond to respective time slots. In a typical embodiment, power-scaling of the two distinct Alamouti codes is unbalanced. Following block 108, control transfers to block 110, where the process 100 terminates and control returns to a calling routine until another PS-QSTBC requires transmission.

FIG. 2 is a flowchart of an example process 200 for communicating in a wireless communication system utilizing a PS-QSTBC that is employed at a receiver, according to another embodiment of the present disclosure, is illustrated. The process 200 (which may be implemented in software or hardware) is initiated in block 202, at which point control transfers to block 204. In block 204, a PS-QSTBC is received (e.g., at an SS) via one or more receive antennas. A power-scaling factor (which is the same for each modulation type) for the PS-QSTBC is typically selected (e.g., at a serving BS) to provide full-diversity gain and full-rate transmission for data that is received.

According to various aspects of the present disclosure, the PS-QSTBC is created using two distinct Alamouti codes. In various embodiments, the two distinct Alamouti codes are utilized to form a sixteen element matrix having four columns and four rows. In at least one embodiment, each of the four columns of the matrix correspond to respective transmit antennas and each of the four rows correspond to respective time slots. In a typical embodiment, power-scaling of the two distinct Alamouti codes is unbalanced. Next, in block 206, the PS-QSTBC is decoded to recover transmitted data. Following block 206, control transfers to block 208, where control terminates and control returns to a calling routine until another PS-QSTBC is received.

Figure 3:
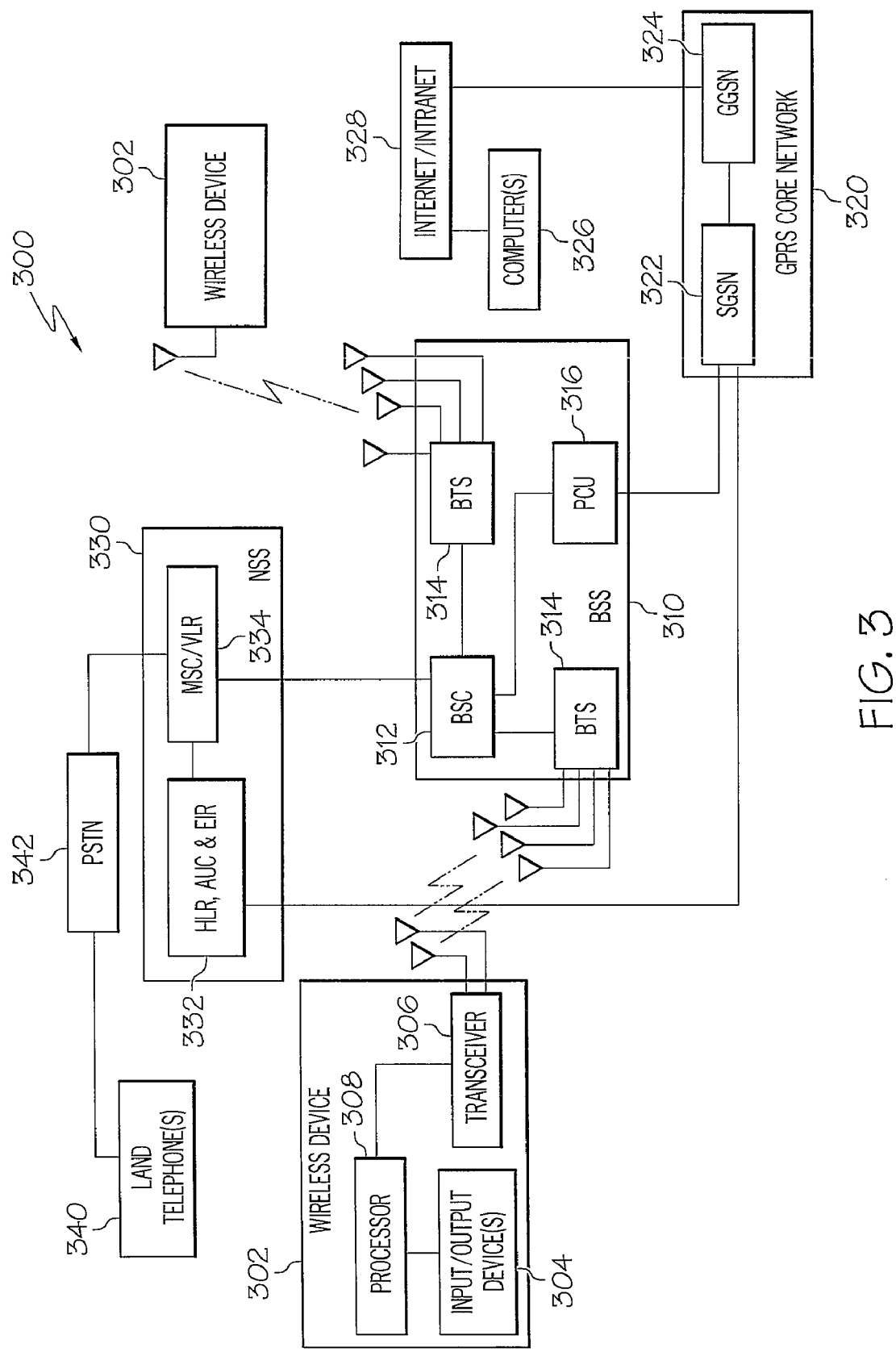

With reference to FIG. 3, an example wireless communication system 300 is depicted that includes a plurality of wireless devices (subscriber stations) 302, e.g., hand-held computers, personal digital assistants (PDAs), cellular telephones, etc., that may be configured to communicate in accordance with the present disclosure. For example, the wireless devices 302 may include receivers that are configured to receive and decode PS-QSTBCs using, for example, the process 200 of FIG. 2. For example, the process 200 may be executed by a DSP or an ASIC. In general, the wireless devices 302 include a processor 308 (e.g., a digital signal processor (DSP)) that employs a software system, a transceiver 306, and one or more input/output devices 304 (e.g., a camera, a keypad, display, etc.), among other components not shown in FIG. 3.

The wireless devices 302 communicate with a base station controller (BSC) 312 of a base station subsystem (BSS) 310, via one or more base transceiver stations (BTS) 314, to receive or transmit, control signals, voice, data, or control signals, voice, and data. The BSC 312 may, for example, be configured to schedule communications for the wireless devices 302. Alternatively, the BTS 314 may schedule communications for the wireless devices 302 in which the BTS 314 is in communication. In either case, a scheduler typically employs one or more processors (that execute a software system) to schedule communications. In various embodiments the BTS 314 is configured to transmit PS-QSTBCs according to the present disclosure. For example, the BTS 314 may be configured to transmit PS-QSTBCs according to the process 100 of FIG. 1.

The BSC 312 is also in communication with a packet control unit (PCU) 316, which is in communication with a serving general packet radio service (GPRS) support node (SGSN) 322. The SGSN 322 is in communication with a gateway GPRS support node (GGSN) 324, both of which are included within a GPRS core network 320. The GGSN 324 provides access to computer(s) 326 coupled to Internet/intranet 328. In this manner, the wireless devices 302 may receive data from and/or transmit data to computers coupled to the Internet/intranet 328. For example, when the devices 302 include a camera, images may be transferred to a computer 326 coupled to the Internet/intranet 328 or to another one of the devices 302. The BSC 312 is also in communication with a mobile switching center/visitor location register (MSC/VLR) 334, which is in communication with a home location register (HLR), an authentication center (AUC), and an equipment identity register (EIR) 332. In a typical implementation, the MSC/VLR 334 and the HLR, AUC, and EIR 332 are located within a network and switching subsystem (NSS) 330, which may also perform scheduling for the system 300. The SGSN 322 may communicate directly with the HLR, AUC and EIR 332. As is also shown, the MSC/VLR 334 is in communication with a public switched telephone network (PSTN) 342, which facilitates communication between wireless devices 302 and land telephones 340. It should be appreciated that other types of wireless systems, having different configurations, may implement various aspects of the PS-QSTBC techniques disclosed herein.

Accordingly, a PS-QSTBC that is capable of providing full-diversity gain and full-rate transmission with double-symbol decoding has been described herein. An optimum power-scaling factor for the disclosed PS-QSTBC is fixed with different modulation types (and constellation rotation is not required), as contrasted with known QSTBCs that employ constellation rotation (where a different optimum rotation angle is required for each modulation type scheduled). In general, constructing a codeword for a QSTBC based on two Alamouti codes that are power scaled in an unbalanced manner provides a PS-QSTBC that is robust against spatial correlation and/or time-selectivity of fading channels while achieving full-diversity gain (when the power-scaling factor is optimal) and full-rate transmission. It is contemplated that the techniques described herein may be advantageously employed in various wireless communication systems that comply with a number of different standards, e.g., long-term evolution (LTE) and worldwide interoperability for microwave access (WiMAX).

As may be used herein, a software system can include one or more objects, agents, threads, subroutines, separate software applications, two or more lines of code or other suitable software structures operating in one or more separate software applications, on one or more different processors, or other suitable software architectures.

As will be appreciated, the processes in preferred embodiments of the present invention may be implemented using any combination of software, firmware or hardware. For example, software that implements the processes 100 of FIG. 1 and 200 of FIG. 2 may be executed by a processor of a BS and/or an SS or be embodied in hardware. As a preparatory step to practicing the invention in software, code (whether software or firmware) according to a preferred embodiment will typically be stored in one or more machine readable storage mediums such as fixed (hard) drives, diskettes, optical disks, magnetic tape, semiconductor memories such as read-only memories (ROMs), programmable ROMs (PROMs), etc., thereby making an article of manufacture in accordance with the invention. The article of manufacture containing the code is used by either executing the code directly from the storage device or by copying the code from the storage device into another storage device such as a hard disk, random access memory (RAM), etc. The method form of the invention may be practiced by combining one or more machine-readable storage devices containing the code according to the present disclosure with appropriate standard processing hardware to execute the code contained therein. An apparatus for practicing the techniques of the present disclosure could be one or more BSs and/or SSs that access code in accordance with the present disclosure.

Although the invention is described herein with reference to specific embodiments, various modifications and changes can be made without departing from the scope of the present invention as set forth in the claims below. For example, the techniques disclosed herein are generally broadly applicable to transmitters and receivers, irrespective of their location, in a communication system. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for communicating in a wireless communication system, comprising:

creating, using two distinct Alamouti codes, a power-scaled quasi-orthogonal space-time block code; and transmitting, using a transmitter, the power-scaled quasi-orthogonal space-time block code over multiple antennas, wherein the power-scaled quasi-orthogonal space-time block code is represented by a transmission codeword $C_N$, using the two distinct Alamouti codes A and B as follows:

$$C_N = \begin{bmatrix} \sqrt{\frac{P}{2} - \lambda} A + \sqrt{\lambda} B & 0 \\ 0 & \sqrt{\lambda} A - \sqrt{\frac{P}{2} - \lambda} B \end{bmatrix}, 0 \leq \lambda < \frac{P}{2}$$

where $\lambda$ is a power-scaling factor and P is a total transmitted power per symbol duration.

2. The method of claim 1, wherein the two distinct Alamouti codes are represented as a sixteen element matrix having four columns and four rows, wherein the four columns each correspond to respective transmit antennas and the four rows each correspond to respective time slots.

3. The method of claim 1, further comprising:

selecting a power-scaling factor for the power-scaled quasi-orthogonal space-time block code to provide full-diversity gain and full-rate transmission.

4. The method of claim 1, wherein the multiple antennas includes three or four transmit antennas.

5. The method of claim 1, wherein the transmitter is included in a base station.

6. The method of claim 1, wherein the transmitter is included in a subscriber station.

7. A method for communicating in a wireless communication system, comprising:

receiving, using a receiver, a power-scaled quasi-orthogonal space-time block code, wherein the power-scaled quasi-orthogonal space-time block code is based on two distinct Alamouti codes, and wherein the power-scaled quasi-orthogonal space-time block code is transmitted over multiple antennas; and decoding the power-scaled quasi-orthogonal space-time block code to recover transmitted data, wherein the power-scaled quasi-orthogonal space-time block code is represented by a transmission codeword $C_N$, using the two distinct Alamouti codes A and B as follows:

$$C_N = \begin{bmatrix} \sqrt{\frac{P}{2} - \lambda} A + \sqrt{\lambda} B & 0 \\ 0 & \sqrt{\lambda} A - \sqrt{\frac{P}{2} - \lambda} B \end{bmatrix}, 0 \leq \lambda < \frac{P}{2}$$

where $\lambda$ is a power-scaling factor and P is a total transmitted power per symbol duration.

8. The method of claim 7, wherein the two distinct Alamouti codes are represented as a sixteen element matrix having four columns and four rows, wherein the four columns each correspond to respective transmit antennas and the four rows each correspond to respective time slots.

9. The method of claim 7, wherein a power-scaling factor for the power-scaled quasi-orthogonal space-time block code is selected to provide full-diversity gain and full-rate transmission.

10. The method of claim 7, wherein the multiple antennas include three or four transmit antennas.

11. The method of claim 7, wherein the receiver is included in a base station.

12. The method of claim 7, wherein the receiver is included in a subscriber station.

13. A wireless communication device, comprising:

a circuit configured to create, using two distinct Alamouti codes, a power-scaled quasi-orthogonal space-time block code; and a transmitter coupled to the circuit, wherein the transmitter is configured to transmit the power-scaled quasi-orthogonal space-time block code over multiple antennas, wherein the multiple antennas include three or four transmit antennas and the wireless communication device is included in a base station, and wherein power-scaling for the two distinct Alamouti codes is unbalanced and the power-scaled quasi-orthogonal space-time block code is represented by a transmission codeword $C_N$, using the two distinct Alamouti codes A and B as follows:

$$C_N = \begin{bmatrix} \sqrt{\frac{P}{2}-\lambda}\,A + \sqrt{\lambda}\,B & 0 \\ 0 & \sqrt{\lambda}\,A - \sqrt{\frac{P}{2}-\lambda}\,B \end{bmatrix}, 0 \leq \lambda < \frac{P}{2}$$

where $\lambda$ is a power-scaling factor and P is a total transmitted power per symbol duration.

14. The wireless communication device of claim 13, wherein the two distinct Alamouti codes are represented as a sixteen element matrix having four columns and four rows, wherein the four columns each correspond to respective transmit antennas and the four rows each correspond to respective time slots.

15. The wireless communication device of claim 13, wherein the circuit is further configured to select a power-scaling factor for the power-scaled quasi-orthogonal space-time block code to provide full-diversity gain and full-rate transmission.

* * * * *